United States Patent
Camp et al.

(10) Patent No.: US 6,859,507 B2
(45) Date of Patent: Feb. 22, 2005

(54) METHOD AND APPARATUS FOR CORRECTING A SIGNAL

(75) Inventors: William O. Camp, Chapel Hill, NC (US); Bengt Lindoff, Lund (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 640 days.

(21) Appl. No.: 09/791,266

(22) Filed: Feb. 22, 2001

(65) Prior Publication Data

US 2002/0009162 A1 Jan. 24, 2002

(30) Foreign Application Priority Data

Feb. 29, 2000 (EP) ............................................. 00610026

(51) Int. Cl.[7] ............................ H03D 1/04; H03D 1/06; H03K 5/01; H03K 6/04; H04B 1/10
(52) U.S. Cl. ........................ 375/346; 375/224; 375/285
(58) Field of Search ................................ 375/224, 227, 375/340, 316, 279, 259, 260, 261, 285, 343, 346, 348, 349, 350, 329; 329/318, 320, 349, 353

(56) References Cited

U.S. PATENT DOCUMENTS

| | | | | |
|---|---|---|---|---|
| 4,959,619 A | * | 9/1990 | Delacroix et al. | 329/306 |
| 5,095,533 A | | 3/1992 | Loper et al. | 455/245 |
| 5,604,929 A | | 2/1997 | Loper et al. | 455/324 |
| 5,710,792 A | * | 1/1998 | Fukawa et al. | 375/229 |
| 5,774,375 A | | 6/1998 | Behrent | 364/571.01 |
| 5,896,061 A | | 4/1999 | Behrent | 329/308 |

FOREIGN PATENT DOCUMENTS

DE         44 30 679 C1    12/1995

WO         WO 99/57820     11/1999

OTHER PUBLICATIONS

Valenti, Matthew C. et al. "A Bandwidth Efficient Pilot Symbol Technique for Coherent Detection of Turbo Codes over Fading Channels". XP–002146532. 0–7803–5538–5/99/$10.00 © 1999 IEEE.

Noon, David A. et al. "Wideband Quadrature Error Correction (using SVD) for Stepped–Frequency Radar Receivers". IEEE Transactions on Aerospace and Electronic Systems. XP–002162596. vol. 35, No. 4. Oct. 1999.

Zhang, Xinggan et al. "Implementation of the Corrector of I&Q Errors in Coherent Processor with DSP". XP–002162597. 0–7803–3676–3/97/$10.00 © 1997 IEEE.

Partial European Search Report as completed by P. Scriven of the ISA/EP on Mar. 12, 2001, as pertaining to European Patent Application No. 00610026.7.

* cited by examiner

Primary Examiner—Jean B. Corrielus
(74) Attorney, Agent, or Firm—Jenkens & Gilchrist, P.C.

(57) ABSTRACT

A method of correcting a signal transmitted via a communications channel having signal channels carrying base band components which are phase-shifted relative to each other, the method comprising the steps of receiving known samples (TS) of the base band components (500); estimating first parameters ($\alpha$, $\beta$), for correction of second samples, based on the first samples compared with expected first samples; and receiving and correcting second samples of a base band component (I;Q). The method is characterized in further comprising the steps of: estimating second parameters (H) that describe the communications channel (103); and correcting the second samples of the base band component based on the first and second parameters. This finds its application especially in conjunction with direct conversion or homodyne receivers (102; 201) for mobile telecommunications.

23 Claims, 3 Drawing Sheets

METHOD AND APPARATUS FOR CORRECTING A SIGNAL

BACKGROUND OF THE INVENTION

1. Field of the Invention

The present invention relates to a method and apparatus for correcting a signal transmitted via a communications channel having signal channels carrying base band components which are phase-shifted relative to each other.

2. Description of the Prior Art

In communication systems it is often desired to transmit multiple base band components per carrier frequency which are phase-shifted relative to each other.

Common such principles are denoted Phase Shift Keying, PSK, or Quadrature Amplitude Modulation, QAM, in which a carrier frequency is amplitude modulated with a first base band signal and a second base band signal phase shifted 90 degrees relative to the first base band signal. Typically, the first base band signal is denoted an in-phase component and the second base band signal is denoted a quadrature phase component.

In order to transmit and receive PSK signals with a sufficient high quality, transmitters and receivers using intermediate frequencies have been used so far. Intermediate frequencies are frequencies in the range between the base band and the carrier frequency. However, in systems and consumer products where cost and complexity are important parameters to minimise, this solution is far from optimal since it requires numerous components to generate the intermediate frequency.

Homodyne or direct conversion receivers are cheaper and less complex candidates for receiving PSK signals. These receivers are characterised by converting the frequency band about the carrier frequency direct down to base band and vice versa for transmitters. However, in homodyne or direct conversion receivers distortion in the form of amplitude and phase mismatch between the base band components are much more difficult to control.

In communication systems communicating digital symbols e.g. in the most common mobile telecommunications systems such as the Global System of Mobile telecommunications (GSM) the symbols are transmitted in bursts or packets. Such bursts or packets typically include sequence of training symbols in the burst or packet for the purpose of correcting symbols representing the payload i.e. the information that it is the purpose to communicate. Symbols are extracted by sampling the base band components.

The above mentioned communication systems find its application in mobile communication terminals or base stations in cellular communication systems e.g. TDMA systems comprising GSM and EDGE mobile telephone systems.

Thus there is a need for a communication method providing a high communication quality while using simple means for the communication.

U.S. Pat. No. 5,774,375 discloses a method and an apparatus for correcting signal-pairs from vectors that represent in-phase signals (I) and quadrature signals (Q). The correction includes calculating the most probable correction values of offsets from a center point in the IQ-plane of signal-pairs using a sequence of I and Q signal values and based on an equation of a circle. Amplitude and phase errors are corrected as a function of the sequence of I and Q signal values after a preceding correction of the center point.

U.S. Pat. No. 5,896,061 discloses a homodyne receiver and a method of correcting a received signal. There is provided an arithmetic unit that is designed for converting an ellipse set by distorted I and Q signals into a circle. The ellipse is determined by parameters using at least five samples of the I and Q signals. From the ellipse parameters the errors causing the elliptical form are then calculated and compensated.

U.S. Pat. No. 5,604,929 discloses a system for correcting gain and phase errors in a direct conversion receiver having a pair of signal channels carrying I and Q base band signal components in a quadrature relationship. The system operates by treating phase and amplitude errors as resident in the channel carrying Q baseband signal components and by generating a plurality of intermediary signals that incorporate a trigonometric product the I and Q components to produce a pair of correction factors that maintains a matched quadrature relationship between the two signal channels.

U.S. Pat. No. 5,095,533 discloses a direct conversion receiver having a tri-phase architecture including three separate base band signal channels. Two of the base band components are then used to form a highly accurate quadrature component which may be utilized in combination with the in-phase or reference component for demodulating the base band signals.

However, the prior art is only concerned with correcting phase and gain errors arising from imperfect phase shift means in the receivers/transmitters.

Consequently, the prior art involves the problem that distortion in the form of amplitude and phase mismatch are not corrected sufficiently for in the process of correcting a received signal.

SUMMARY OF THE INVENTION

Thus an object of this invention is to correct a signal more precisely.

According to one aspect of the present invention, this is achieved by a method for correcting a signal transmitted by a communications channel having signal channels carrying base band components which are phase-shifted relative to each other, the method comprising receiving first samples of the base band components, estimating first parameters for correction of second samples based on the first samples compared with expected first samples, receiving and correcting second samples of a base band component, estimating second parameter that describe the communications channel, and correcting the second samples of the base band component based on the first and second parameters.

Consequently, imperfections in the e.g. in the form of phase and amplitude mismatch introduced in communications means e.g. the direct conversion receiver can be corrected for more precisely.

Thereby, effects, in the receiver itself, varying very slowly over time and causing amplitude and phase mismatch can be corrected for on a more precise basis substantially invariant to changes in the communications channel characteristic. Especially, for mobile communications equipment the communications channel characteristic may vary much. Thus an improved communication quality can be obtained.

BRIEF DESCRIPTION OF THE DRAWINGS

The invention will be explained more fully below in connection with a preferred embodiment and with reference to the drawing, in which.

DETAILED DESCRIPTION OF PRESENTLY PREFERRED EMBODIMENT OF THE INVENTION

Figure 1:
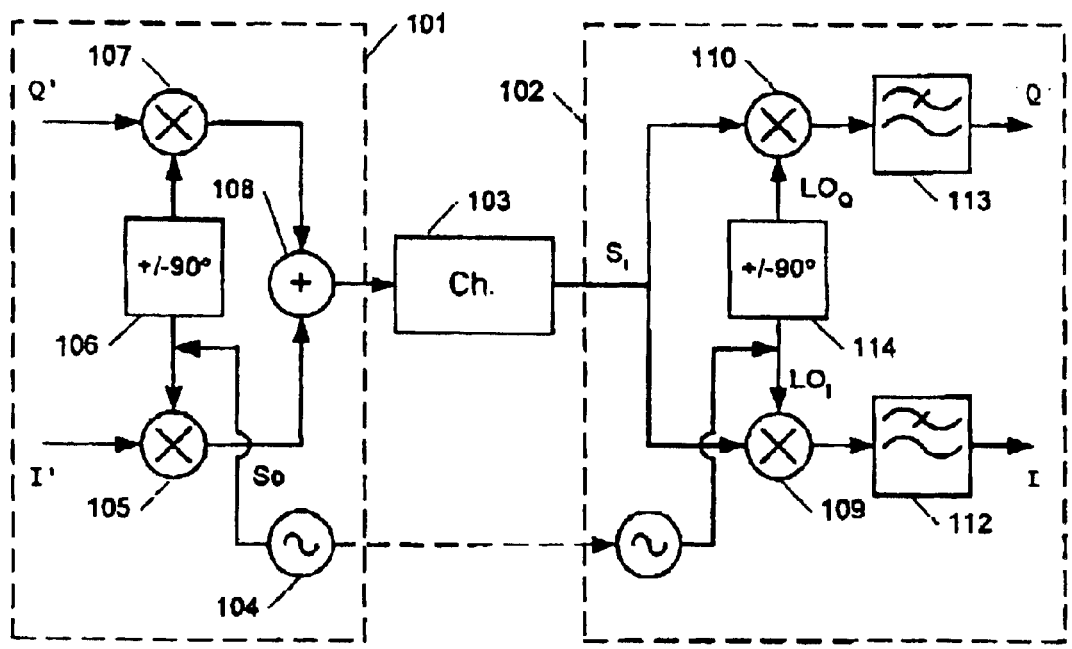
FIG. 1 shows a transmitter and a receiver providing quadrature-carrier multiplexing and de-multiplexing.

FIG. 1 shows a transmitter and a receiver providing quadrature carrier multiplexing and de-multiplexing. A system comprised of a transmitter 101, a receiver 102, and a communication channel 103 provides for transmission of two base band components I and Q by a single carrier frequency. The base band component I is typically denoted an in-phase component and the base band component Q is denoted a quadrature phase component. An oscillator 104 provides a carrier signal $s_o$ at a carrier frequency $\omega_o$. The in-phase component I is mixed with the carrier signal $s_c$ by means of the mixer 105 thereby providing an in-phase amplitude modulated signal. The quadrature component Q is mixed with the carrier signal received via the phase shifting means 106, shifting the phase of the carrier signal $s_c$ 90 degrees, thereby providing a quadrature phase amplitude modulated signal. The in-phase amplitude modulated signal and the quadrature phase amplitude modulated signal are added in an adder 108 providing a communication signal that can be transmitted via the communications channel 103. The communications signal can be transmitted as a wired and/or a wireless signal.

In the receiver 102, the communication signal transmitted via the communications channel 103 can be received and demodulated. The communication signal is supplied to a first mixer 109 and a second mixer 110 by means of which the communication signal is mixed with a signal in phase with the carrier signal and a signal phase shifted 90 degrees relative to the carrier signal, respectively. A signal in phase with the carrier is provided by the oscillator 114 that can be e.g. a phase-locked loop connected to lock to the carrier frequency of the communication signal. The phase-shifted signal is provided by means of the phase shifting means 114. Output from the mixers 109 and 110 are supplied to low-pass filters 112 and 113, respectively, for isolating base band components about DC.

It should be noted that sources to distortion in such transmitters/receivers are offsets from the 90 degrees phase shift in the phase shifting means 106 and 114 and gain mismatch between the I and Q path through the mixers 105 and 107, respectively.

A direct conversion or homodyne transmitter/receiver system is described. The invention is applicable generated in such a using system or in another type of transmitter/receiver system transmitting information generated using IQ modulators.

The receiver can also be described in mathematical terms. A signal $s_t$ received from the communications channel by the receiver 102 can be written as:

$$S_t = r_t \cos(\omega_0 t + \phi_t)$$

where $\omega_0$ is the carrier frequency, $r_t$ is an amplitude including information carried by the carrier, and $\phi_t$ is a phase including information carried by the carrier. Generally, subscript t for a variable indicates that the variable is time-dependent.

The oscillator signals $LO_I$ and $LO_Q$ provided to the mixers 109 and 110, respectively, can be written as:

$$LO_I(t) = \tilde{A}_I \cos(\omega_0 t)$$

$$LO_Q(t) = \tilde{A}_Q \sin(\omega_0 t + \gamma)$$

where $\tilde{A}_I$ and $\tilde{A}_Q$ are gains for the I and Q path. $\gamma$ is a phase offset caused by the receiver means.

The output from the low-pass filter 112 i.e. the I path can be derived and written as:

$$I = LPF\{r_t \cos(\omega_0 t + \varphi_t) \times \cos(\omega_0 t)\}$$

$$= \frac{\tilde{A}_I}{2} r_t \cos(\varphi_t)$$

where LPF is a low-pass filer operator. Likewise, the output from the low-pass filter 113 i.e. the Q path can be written as:

$$Q = \frac{\tilde{A}_Q}{2} r_t \sin(\varphi_t - \gamma)$$

$$= \frac{\tilde{A}_Q \cos(\gamma)}{2} r_t \sin(\varphi_t) - \frac{\tilde{A}_Q \sin(\gamma)}{2} r_t \cos(\varphi_t)$$

Thus an expression for the I and Q signals is provided.

Figure 2:
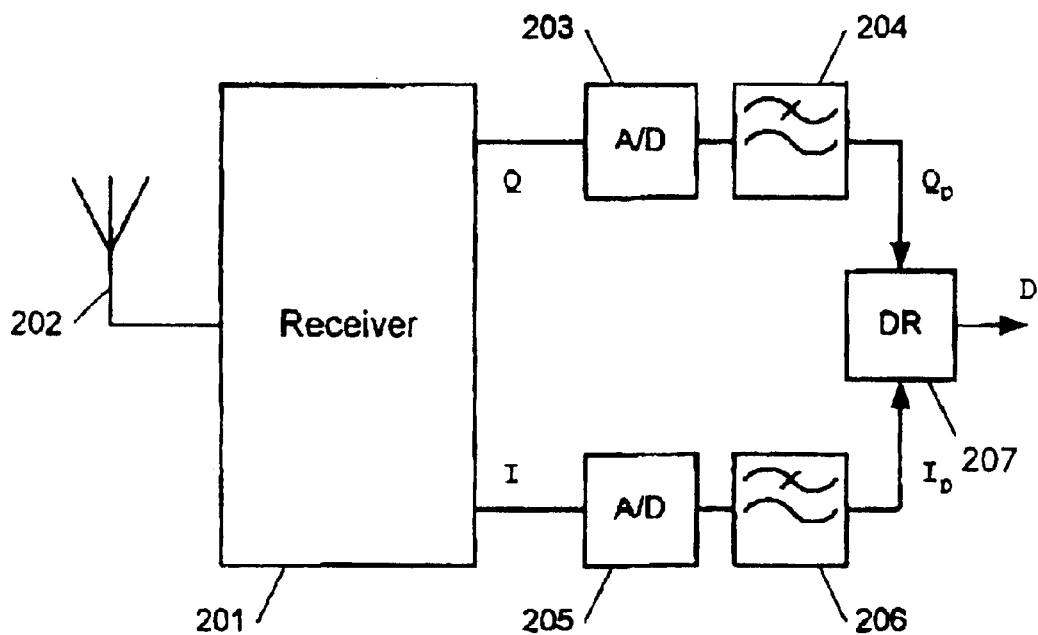
FIG. 2 shows a receiver with a data recovery unit.

FIG. 2 shows a receiver with a digital data recovery unit. The digital data recovery unit is connected to process data received by the receiver 201. The receiver can be connected to antenna means 202 for receiving wireless communication signals. The receiver provides in-phase and quadrature phase components I and Q e.g. as discussed above. The I and Q components are sampled and converted to digital signals $I_D$ and $Q_D$ in analogue-to-digital converters 203 and 205, respectively. Subsequently, the digital signals are filtered by means of filters 204 and 206 thereby providing two digital signals to the data recovery unit 207.

It is discovered that the above expressions for I and Q can be normalised and rewritten as:

$$I_D = I_t$$

$$Q_D = aQ_t + bI_t$$

where $I_t = r_t \cos(\phi_T)$ and $Q_t = r_t \sin(\phi_T)$ are desired, i.e., non-distorted I and Q components. As stated above, the digital signals $I_D$ and $Q_D$ are input to the data recovery unit 207. The data recovery unit 207 is adapted to perform synchronisation, channel estimation and equalisation of the received signals.

In digital transmissions systems e.g. TDMA systems comprising Global System of Mobile telecommunications (GSM) and D-AMPS it can be assumed that the signals input to the data recovery unit can be written in complex notation:

$$S_t^{mod\ el\_0} = I_t + jQ_t = H^T U_t + \epsilon_t$$

where $j = \sqrt{-1}$, $H = [h_0, K, h_L]^T$ is a vector of complex valued channel filter taps, $U_t = [u_t, K, u_{t-L}]^T$ is a vector of complex valued symbols received by the receiver 201, and $\epsilon_t$ is some type of complex valued noise.

However, it is discovered that the above model is not satisfactory.

According to the above expressions for $I_D$ and $Q_D$, the model $S_t^{mod\ el}$ above can be extended according to the following:

$$S_t^{model\_1} = I_{D,t} + jQ_{D,t}$$
$$= I_t + j(aQ_t + bI_t)$$
$$= I_t + jQ_t + j((a-1)Q_t + bI_t)$$
$$= H^T U_t + e_t + j((a-1)Q_t + bI_t)$$

When the model $S_t^{mod\ el\_0}$ is implemented in the data recovery 204 unit, the term $j((a-1)Q_t+bI_t)$ will be treated as noise in the data recovery unit resulting in degraded receiver performance. The receiver performance will be degraded, especially when the noise into the antenna is neglectable i.e. $e_t \approx 0$, since then $\hat{\epsilon}_t \approx j((a-1)Q_t+bI_t)$.

Thus there is a great need for a method that can compensate for such an amplitude and phase mismatch between the I and Q components in a cost and size efficient way.

Figure 3:
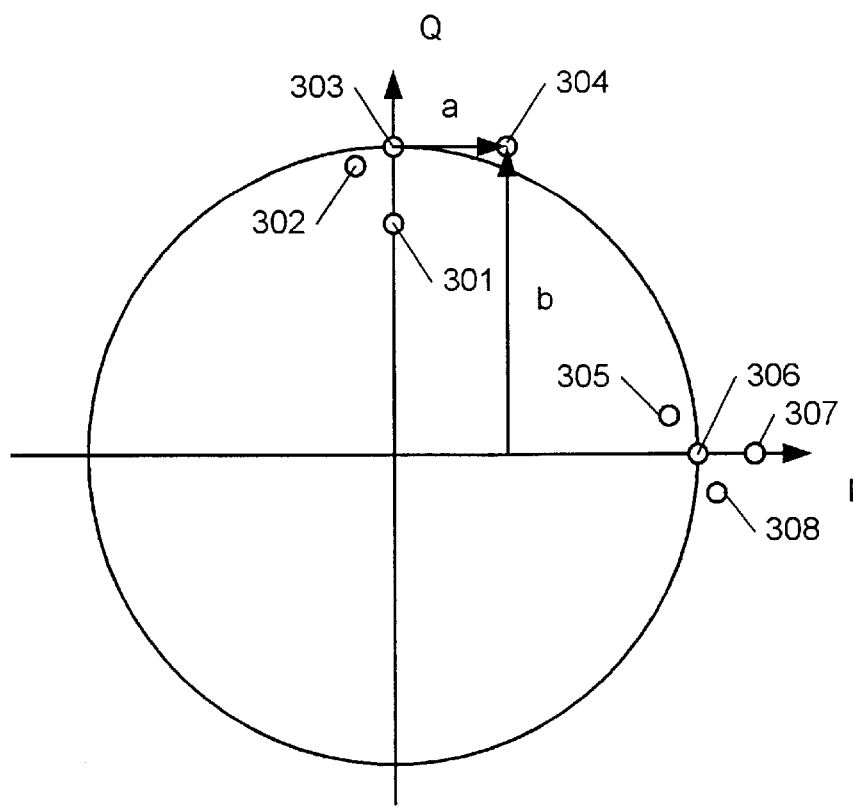
FIG. 3 shows a set of test data mapped into a real/imaginary numbers plane.

FIG. 3 shows a set of test data mapped into a real/imaginary numbers plane. In different types of communication systems a set of test data is transmitted to a receiver for the purpose of calibrating or otherwise adjusting the receiver. Such test data are shown as sample points in the real/imaginary numbers plane—the IQ-plane. The sample points 301, 302, 303, and 304 are expected to be positioned at the intersection point between the Q-axis and the unit circle. Whereas the sample points 305, 306, 307, and 308 are expected to be positioned at the intersection point between the I-axis and the unit circle. Thus it can be seen that the test data have been distorted somewhere in the communications system between the transmitter and the receiver—or in the transmitter and/or receiver since they are offset from the intersection points. The offset for an individual sample point can be described by the parameters a and b representing an offset along the I-axis and the Q-axis, respectively.

Figure 4:
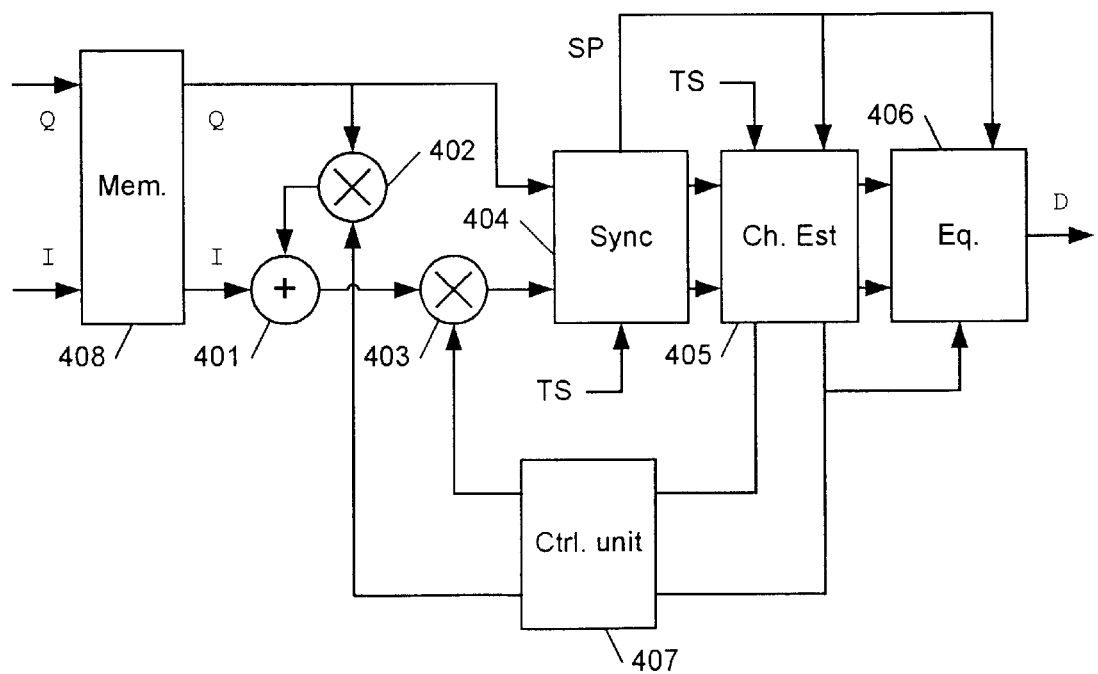
FIG. 4 shows a data recovery unit according to an embodiment of the present invention.

FIG. 4 shows a data recovery unit according to the present invention. The data recovery unit corresponds to the data recovery unit 207 and is adapted to receive the digital signals $Q_D$ and $I_D$ as inputs to provide digital data output D. The digital signals $Q_D$ and $I_D$ are input via a buffer or first-in-first-out memory 408.

Remembering the mathematical notation from above, the amplitude and phase mismatch can be digitally compensated by subtracting a fraction β of the in-phase component I from the quadrature phase component Q and rescale the resulting quadrature component Q with a factor α. According to the invention, the parameters α and β can be estimated together with the channel filter taps H.

The signals $Q_D$ and $I_D$ can be written as:

$$I_{D,t} = I_t$$

$$Q_{D,t} = \alpha Q_t + bI_t$$

From the Q component a fraction $\hat{\beta}$ of the I component is subtracted, where $\hat{\beta}$ is an estimate of b. Then $Q_t - \hat{\beta}I_t$ is multiplied with a factor a which is $\hat{\alpha}$ estimate of 1/a. The new Q component, $$Q_t = \hat{\alpha}(Q_t - \hat{\beta}I_t)$$

together with the I component are then fed to a synchronizing unit 404 that by correlating a known training sequence (TS) with the received signal $$S_t(\alpha,\beta) = I_t 30\ jQ_t$$

containing the same known training sequence, finds a synchronizing position. The synchronising unit 404 is adapted to synchronize data received from the memory 408 with a sequence (TS) of training data. A synchronizing position signal SP, indicating a position in a sequence of data from the memory for greatest possible correlation between this sequence and the sequence (TS), is supplied to a channel estimator unit 405 and an equaliser 406. The channel estimator 405 is adapted to provide an estimate of the communications channel 103 on the basis of the sequence (TS) of training data. This estimate is provided in the form of complex filter tap parameters H in conjunction with an estimate of the noise variance $\sigma_e^2$. The channel parameters can be estimated by means of standard techniques in the field of channel model estimation e.g. by means of least-squares techniques. The channel parameters are supplied to the control unit 407 that on the basis of the channel parameters calculates new α and β. The α estimate are fed to the multiplier 403 and the β estimate are fed to the multiplier 402. The process of estimating the channel parameters and α and β can be repeated until a satisfactory result is achieved e.g. repeating the process until the noise is reduced to below a specified level, or until a sufficient small change in parameters values from iteration to iteration is detected.

Thus when $\hat{\alpha}=1/a$ and $\hat{\beta}=b$, the signal model $S_t^{mod\ el\_1}$ used in the data recovery unit is in correspondence with the true signal.

The control unit 407 is adapted to control the iteration process. When the control unit decides to terminate the iterations, the best channel estimate H together with synchronisation information (SP) and the received sequence of data are fed to the equalizer 406 for detection of the received data. The output D from the equalizer comprises complex hard symbols $\hat{\mu}_t$ and so-called soft values representing the uncertainty in determining which symbol a given sample point can be.

Figure 5:
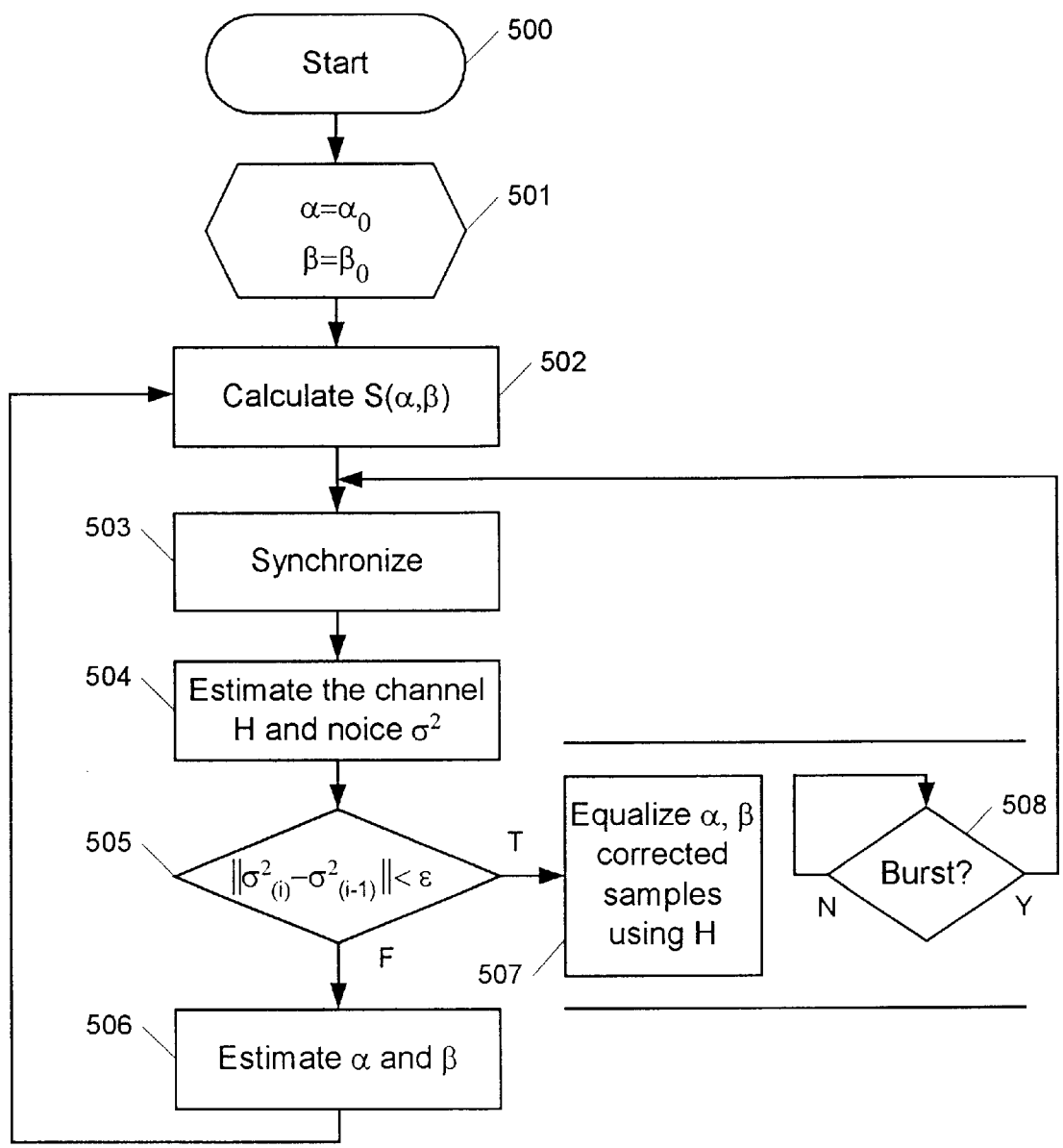
FIG. 5 shows a flowchart for a method of estimating parameters and using the parameters to compensate for mismatch.

FIG. 5 shows a flowchart for a method of estimating parameters and using the parameters to compensate for mismatch. The method can be implemented as a program or an algorithm in a programmable device e.g. an Application Specific Integrated Circuit (ASIC) or other type of signal processor connected to receive data from a receiver.

In step 500 the programmable device receives a known training sequence (TS). In step 501 the variables α and β are assigned initial values $\alpha_0$ and $\beta_0$ obtained from a prior estimation process, if any, or an initial guess. On the basis of α and ⊖ the response $S_t(\alpha,\beta)$ is calculated in step 502 and a iterative loop is entered.

In step 503 the received training sequence (TS) is synchronized with a stored sequence to find a best possible synchronization position. Having found this synchronization position, it is possible to estimate H and the noise variance $\sigma_e^2$ by means of an estimation method, e.g. a least-squares method.

When H is estimated, it is tested whether the calculated noise variance in a current iteration, i, is reduced significantly relative to the calculated noise variance in a prior iteration i-1. The test can be stated by the following expression:

$$\|\sigma_i^2 - \sigma_{i-1}^2\| < \epsilon$$

Thereby it is tested whether the numerical difference in noise variance from one iteration to another is so small (less than the value ε) that no further iterations will reduce the noise variance significantly.

If the expression is true (T), data can be received and compensated in step 507 using the parameters α, β, and H. That is, data is corrected using α and β, and equalized using H. While step 507 is running a concurrent process 508 is running for testing whether a new estimation process should be initiated. In case of digital transmission where data is transmitted as bursts or small packets, the process 508 can be adapted to detect start of such bursts or packets. Typically such digital transmissions e.g. in the Global System of Mobile telecommunication (GSM), bursts include a training sequence that can be used for the estimation process as described above. If a burst is detected or another event occurs, e.g. the elapse of a timer that triggers the process 508 the synchronizing process 504 is entered. The training sequence can be located e.g. in the middle of a burst or in the beginning of a burst.

If the expression is false (F), $\alpha$ and $\beta$ are re-estimated and the loop is closed by returning to step 502 for calculating $S_t(\alpha,\beta)$.

Thus the compensation process comprises the steps of: adjusting base band components; estimating the channel; estimating $\alpha$ and $\beta$ for adjusting the base band components; and repeating this until a satisfactory result is obtained and finally adjusting the base band components and compensate for channel imperfections.

In a preferred embodiment, the update of the correction parameters ($\alpha$ and $\beta$) is not necessarily done every burst, but is done every $n^{th}$ burst, every $n^{th}$ second, or every time the carrier frequency is changed. A control unit triggers the iteration process for finding new $\alpha$ and $\beta$ values. However, the synchronization, channel estimation, and equalization procedure is done every burst.

What is claimed is:

1. A method of correcting a signal transmitted via a communications channel having signal channels carrying base band components which are phase-shifted relative to each other, said method comprising:

receiving first samples of the base band components;

estimating first parameters, for correction of second samples, base on the first samples compared with expected first samples;

receiving second samples of the base band components;

estimating second parameters that describe the communications channel; and correcting the second samples of the base band components based on the first and second parameters.

2. A method according to claim 1, wherein the base band components comprise an in-phase component and a quadrature component.

3. A method according to claim 1, wherein the first and second parameters are estimated by finding parameters in a model comprising a filter term including filter parameters representing the communications channel, a scaled first base band component term, and a scaled second base band component term.

4. A method according to claim 1, wherein the first and second parameters are estimated by finding model parameters that comprise filter parameters organised in a vector $\hat{H}$ representing the communications channel, and scaling parameters (a-1) and b representing scaling of first and second base band components, respectively, said model being represented by the following equation $$\hat{H}^T U_t + j((a-1)Q_t + bI_t)$$

which is optimised with respect to least squares, where $j = \sqrt{-1}$, $U_t$ is a vector of the finite length of second samples received in a time interval up to time t, and $Q_t$, $I_t$ are second samples at time t.

5. A method according to claim 3, wherein the step of correcting the V second samples comprises subtraction of the scaled second base band component term from the scaled first base band component term and multiplication of that result with the reciprocal value of an estimated scale of the first base band component term.

6. A method according to claim 1, further comprising synchronising a sequence of the first samples relative to a sequence of expected first samples prior to estimating first parameters.

7. A method according to claim 1, further comprising the steps of detecting an event by monitoring the communications channel and providing signal indicating that an estimate of parameters for the correction of second samples is to be initiated.

8. A method according to claim 1, wherein the receiving steps comprise:

down-converting and band-pass filtering a signal channel via a direct conversion receiver to provide the base band components; and sampling the base band components to provide the first and second samples.

9. A computer-readable medium having a program recorded thereon, wherein the program, when executed, is operative to cause a computer to correct a signal transmitted via a communications channel having signal channels carrying base band components which are phase-shifted relative to each other, the program being operative to cause the computer to:

receive first samples of the base band components;

estimate first parameters, for correction of second samples, base on the first samples compared with expected first samples;

receive second samples of the base band components;

estimate second parameters that describe the communications channel; and correct the second samples of the base band components based on the first and second parameters.

10. A medium according to claims 9, wherein the base band components comprise an in-phase component and a quadrature component.

11. A medium according to claim 9, wherein the first and second parameters are estimated by finding parameters in a model comprising a filter term including filter parameters representing the communications channel, a scaled first base band component term, and a scaled second base band component term.

12. A medium according to claim 9, wherein the first and second parameters are estimated by finding model parameters that comprise filter parameters organised in a vector $\hat{H}$ representing the communications channel, and scaling parameters (a-1) and b representing scaling of first and second base band components, respectively, said model being represented by the following equation $$\hat{H}^T U_t + j((a-1)Q_t + bI_t)$$

which is optimised with respect to least squares, where $j = \sqrt{-1}$, $U_t$ is a vector of the finite length of second samples received in a time interval up to time t, and $Q_t$, $I_t$, are second samples at time t.

13. A medium according to claim 11, wherein the program is operative to cause the computer to correct the second samples, the correction comprising subtraction of the scaled second base band component term from the scaled first base band component term and multiplication of that result with the reciprocal value of an estimated scale of the first base band component term.

14. A medium according to claim 9, wherein the program is further adapted to cause the computer to synchronise a sequence of the first samples relative to a sequence of expected first samples prior to estimating first parameters.

15. A medium according to claim 9, wherein the program is operative to cause the computer to detect an event by monitoring the communications channel and providing a signal indicating that an estimate of parameters for the correction of second samples is to be initiated.

16. An apparatus adapted to correct a signal transmitted via a communications channel having signal channels carrying base band components which are phase-shifted relative to each other, the apparatus comprising:
   means for receiving first samples of the base band components;
   means for estimating first parameters, for correction of second samples, based on the first samples compared with expected first samples;
   means for receiving second samples of the base band components;
   means for estimating second parameters that describe the communications channel; and
   means for correcting the second samples of the base band components based on the first and second parameters.

17. An apparatus according to claim 16, wherein the base band components comprise an in-phase component and a quadrature component.

18. An apparatus according to claim 16, wherein the first and second parameters are estimated by finding parameters in a model comprising a filter term including filter parameters representing the communications channel, a scaled first base band component term, and a scaled second base band component term.

19. An apparatus according to claim 16, wherein the first and second parameters are estimated by finding model parameters that comprise filter parameters organised in a vector $\hat{H}$ representing the communications channel, and scaling parameters (a−1) and b representing scaling of first and second base band components, respectively, said model being represented by the following equation $$\hat{H}^T U_t + j((a-1)Q_t + bI_t)$$

which is optimised with respect to least squares, where $j=\sqrt{-1}$, $U_t$ is a vector of the finite length of second samples received in a time interval up to time t, and $Q_t$, $I_t$ are second samples at time t.

20. An apparatus according to claim 18, wherein the means for correcting the second samples comprises means for subtracting the scaled second base band component term from the scaled first base band component term and means for multiplying that result with the reciprocal value of an estimated scale of the first base band component term.

21. An apparatus according to claim 16, further comprising means for synchronising a sequence of the first samples relative to a sequence of expected first samples prior to estimating parameters.

22. An apparatus according to claim 16, further comprising means for detecting an event, the means for detecting comprising means for monitoring the communications channel and means for providing a signal indicating that an estimate of parameters for the correction of second samples is to be initiated.

23. An apparatus according to claim 16, wherein the means for receiving comprise:
   means for down-converting and band-pass filtering a signal channel via a direct conversion receiver to provide the base band components; and
   means for sampling the base band components to provide the first and second samples.

* * * * *